(No Model.)
A. T. HOLT.
MANUFACTURE OF HOSE.
No. 323,149. Patented July 28, 1885.
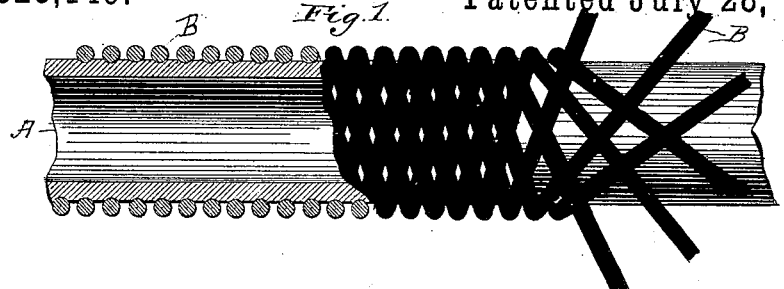
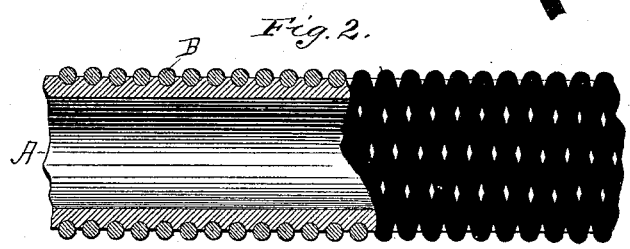
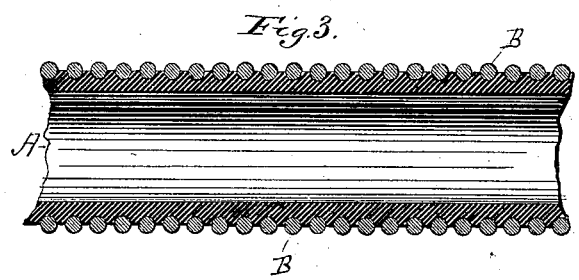
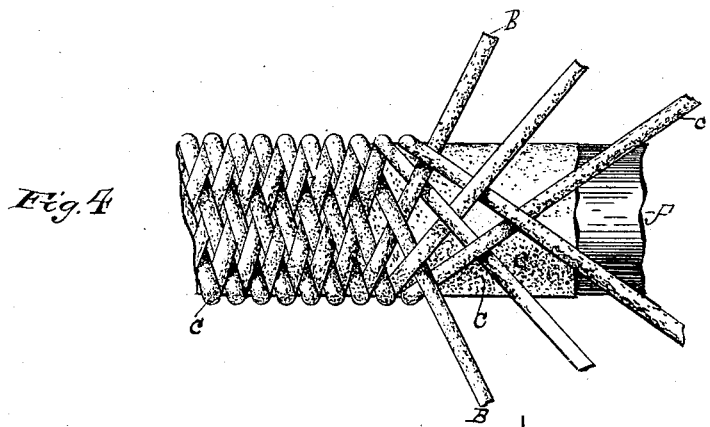

UNITED STATES PATENT OFFICE.

ALBERT T. HOLT, OF BROOKLYN, ASSIGNOR TO LOEWENTHAL & MORGAN-STERN, OF NEW YORK, N. Y.

MANUFACTURE OF HOSE.

SPECIFICATION forming part of Letters Patent No. 323,149, dated July 28, 1885.

Application filed May 2, 1885. (No model.)

*To all whom it may concern:*

Be it known that I, ALBERT T. HOLT, of the city of Brooklyn, Kings county, in the State of New York, have invented a new and useful Improvement in the Manufacture of Hose, of which the following is a full, clear, and exact description, reference being had to the accompanying drawings, in which—

Figure 1 is a side view, partly in section, of a piece of unvulcanized rubber tubing to which the strands of the textile covering are shown as in the act of being applied individually, as by braiding. Fig. 2 is a similar view of a piece of rubber tubing the textile covering of which has been completed and the outer surface of which has been forced into the interstices of the covering by internal pressure. Fig. 3 is a sectional view of the completed hose, the rubber of which has been vulcanized while in the condition shown by Fig. 2. Fig. 4 is a side view of a piece of hose in the first stage of manufacture, a vulcanizable cement having been applied in a soft state to the exterior of the unvulcanized rubber tube prior to applying the strands of the covering. This figure also illustrates an additional feature of manufacture which may be used, if desired, consisting in treating the strands of the textile with a vulcanizable cement previously to braiding them in place.

Like letters indicate like parts in all the figures.

The strands of the textile are somewhat exaggerated in size to more clearly illustrate the invention.

Prior to my invention so-called "rubber hose" has been made by wrapping tightly around a mandrel or former successive layers of rubber and cloth until the requisite amount of both has been applied; then the whole has been bound with strips of cloth to give it the necessary strength, and then the mandrel or former thus covered has been placed in a vulcanizing apparatus, and the rubber incorporated in the hose having been vulcanized, the rubber hose has been stripped off from the mandrel or former. Another method has been, first, to prepare a woven cotton tube or pipe, which subsequently becomes the covering for the hose, and then form a tube or pipe of a suitable diameter to fit inside of the woven covering out of a strip or strips of rubber cut out from sheets of rubber to the desired width, and then rolled up into tube form, the edges of the strips overlapping and united to each other, usually with rubber cement, and then the rubber pipe thus formed has been pulled through the woven covering and the rubber then vulcanized. The hose produced by both these methods is defective for several reasons, but especially because it is practically impossible by either of them to make hose in lengths of more than fifty or sixty feet, and also because the joints formed by the overlapping of the rubber sheets or strips are the weakest parts of the entire hose, and the hose, soon leaking at these joints, the cloth or other fibrous material embodied in the hose becomes wet and very soon rots, and thus the entire hose becomes worthless long before it would were the internal coating of rubber more impervious to the passage of water.

Hose has also been made by drawing over an unvulcanized rubber tube a previously woven tube of fibrous material, expanding the rubber tube into contact with the latter, and then in that condition vulcanizing the rubber. Certain disadvantages attend this method also, and the desired qualities, first, of intimate union of rubber and textile, with the consequent firmness and durability, and, second, strength on the part of the rubber to resist internal pressure, have not been thereby attained. To enable the woven tube to be drawn over the rubber, considerable looseness must be provided for, especially when the hose is made, as is desirable, in long sections. When, therefore, the rubber is to be expanded into close contact with the textile, to produce a firm and durable hose, it becomes necessary to so stretch the rubber as to materially weaken it, which weakness will remain to a serious extent in the finished hose. Moreover, when the contact between the rubber and the textile takes place along a considerable length of the textile at the same instant the embedding of the threads of the textile in the rubber cannot be effected to the desired extent. Furthermore, it is very desirable that the hose should be of uniform size, and present when completed a firm and even external appearance. In order to produce such a hose it is essential that the textile covering should fit closely and evenly upon the rubber tube before the internal pressure is applied. It has been found actually impracticable to produce such a hose by employing any one of the processes above described, for the reason that the rubber tube upon the admission of steam therein will expand less at some points than at others, with the result that at some points the rubber will fail to unite firmly with the loosely-fitting textile covering, while at other points the rubber and covering will be unduly stretched, thus producing a hose of uneven size and unequal firmness. It is much preferable, therefore, to lay the threads of the textile covering individually and under suitable tension upon the rubber tube. This latter is the method I pursue, and I am thereby enabled to furnish at a small cost a firm, durable, and tough hose of any desired length, which has an even and uniform external appearance, due to my process of manufacture.

For a better and more expensive quality of hose, I prefer to apply to the rubber tube a vulcanizable cement, in which the strands of the textile may be laid, and also to treat such strands with a vulcanizable solution.

In the drawings, A A is the continuous seamless tube or pipe of rubber or other vulcanizable compound, prepared, as desired, for the special use intended, as now well known in this art. This tube or pipe is made by the employment of any suitable apparatus now used for the manufacture of seamless rubber tubes or analogous purposes; and it may be of any desired length.

When the tube or pipe is made, it is braided over with a strong cotton braid, B B, or other suitable material. I prefer to treat this fibrous material, either during the braiding operation or afterward, with a solution of naphtha and india-rubber, as indicated at c, so that when the tube or hose is vulcanized as hereinafter explained this solution will act as a cement to cause the braid or other covering to adhere more firmly to the tube or pipe, the rubber in the solution becoming vulcanized by the heat internally applied to the hose, thus converting it into a cement, which firmly holds the braid to the internal tube, as stated. This method also unites the several strands of the braid or other like fibrous covering material firmly to each other, greatly strengthening the hose. If more than one layer of strengthening and protecting material be used, they may all be treated with this cement solution, if desired. At d is indicated a vulcanizable cement applied to the exterior of the rubber tube, and in which the strands of the textile may be laid. After the tube has been thus formed it is placed in any suitable vulcanizing apparatus, and the rubber is forced by internal pressure into the interstices of the textile to effect the necessary vulcanization at the same time. Steam is the preferred agent for this purpose, as it may serve as a vulcanizing as well as an expanding agent; but other means may be used—such, for instance, as hot air or water. The result of the process is that the rubber and textile are uniformly intimately and permanently united, and at the same time the vulcanization is effected, the former being embedded in the interstices of the latter, thus preventing longitudinal movement of one part upon the other, and giving rigidity to the hose against internal or external pressure. Moreover, when the textile has been braided closely upon the rubber the action of steam-pressure will not have the injurious effects that it produces when the covering is loose, as previously described. This particular step of the process—expanding a rubber tube against a textile tube by the action of steam—I am aware has been already practiced, and I do not, therefore, regard such step novel.

I do not claim, broadly, braiding a textile tube over a rubber tube to form a hose, as I am aware that this has heretofore been done.

I do not herein claim the article, this feature having been made the subject-matter of an application for Letters Patent of the United States filed September 17, 1884, bearing Serial No. 143,282, of which this present application is a division.

What I claim herein as new and of my own invention is—

1. The herein-described process for manufacturing hose, consisting, first, in braiding in place directly upon an unvulcanized rubber tube a textile covering, and then by a suitable apparatus applying internal pressure to the rubber tube to force the rubber into the interstices of the textile, and which at the same time vulcanizes the rubber, substantially as set forth.

2. The herein-described process of manufacturing hose, consisting, first, in applying a vulcanizable rubber cement to the exterior of an unvulcanized rubber tube or to the strands of a fibrous material or to both; second, braiding in place directly upon the tube the said strands to form a textile covering, and then by a suitable apparatus applying internal pressure to the rubber tube to force the rubber into the interstices of the textile, and which at the same time vulcanizes the rubber, substantially as set forth.

In testimony whereof I have hereunto set my hand this 1st day of May, 1885.

ALBERT T. HOLT.

Witnesses:
RUDOLPH A. LOEWENTHAL,
ALBERT G. MORGANSTERN.